United States Patent [19]

Pinson

[11] Patent Number: 4,934,805
[45] Date of Patent: Jun. 19, 1990

[54] FIXED STEP CATOPTRIC ZOOM SYSTEM

[75] Inventor: George T. Pinson, Huntsville, Ala.

[73] Assignee: The Boeing Company, Seattle, Wash.

[21] Appl. No.: 262,312

[22] Filed: Oct. 25, 1988

Related U.S. Application Data

[63] Continuation-in-part of Ser. No. 929,356, Nov. 12, 1986, Pat. No. 4,812,030, which is a continuation-in-part of Ser. No. 688,535, Jan. 3, 1985, abandoned.

[51] Int. Cl.$^5$ .................. G02B 17/06; G02B 15/04
[52] U.S. Cl. ...................................... 350/620; 350/429
[58] Field of Search ............... 350/620, 619, 505, 504, 350/503, 520, 422, 254, 429, 559

[56] References Cited

U.S. PATENT DOCUMENTS

| | | |
|---|---|---|
| 2,552,940 | 5/1951 | Cornut . |
| 2,685,820 | 8/1954 | Kaprelian . |
| 3,703,635 | 11/1972 | Burkarth . |
| 3,887,263 | 6/1975 | Thompson . |
| 4,354,742 | 10/1982 | Abel et al. ............ 350/442 |
| 4,407,567 | 10/1983 | Michelet et al. ............ 350/620 |

FOREIGN PATENT DOCUMENTS

| | | |
|---|---|---|
| 2902204 | 7/1980 | Fed. Rep. of Germany . |
| 923191 | 2/1947 | France ............... 350/442 |

OTHER PUBLICATIONS

"An All Reflective Zoom Optical System For the Infrared", 20 Optical Engineering, pp. 450-459 (May/Jun. 1981).

Primary Examiner—Jon W. Henry
Attorney, Agent, or Firm—Finnegan, Henderson, Farabow, Garrett & Dunner

[57] ABSTRACT

A fixed step catoptric zoom optical device comprising a plurality of axially-spaced, readily substituted reflectors disposed in a set for receiving and reflecting energy from an object in the ultraviolet through infrared spectrum to generate a real image of the object on a fixed focal plane. The object is magnified, and the image is focused by changing the individual reflectors in the reflector set using a rotating structure. This effects a change in the shape of the reflectors within the reflector set, and the relative distances between the reflectors and the fixed focal plane.

5 Claims, 3 Drawing Sheets

FIXED STEP CATOPTRIC ZOOM SYSTEM

RELATED APPLICATIONS

This application is a continuation-in-part of the inventor's application Ser. No. 06/929,356, filed Nov. 12, 1986, now U.S. Pat. No. 4,812,030 which in turn is a continuation-in-part of the inventor's application Ser. No. 06/688,535, filed Jan. 3, 1985, which was abandoned.

BACKGROUND OF THE INVENTION

1. Field of the Invention

This invention relates to a device for magnifying and focusing an image. More particularly, the invention relates to a fixed step catoptric zoom system.

2. Description of the Prior Art

Heretofore, zoom optical devices have used multiple refractive lenses or a combination of refractive lenses and reflective elements to achieve selectively magnified images while correcting for chromatic and monochromatic aberrations. Use of refractive lenses in such devices reduces the amount of energy that reaches a detector element and introduces chromatic aberrations. For example, each lens results in energy intensity losses because of surface reflections and because of absorption as the energy travels through the lens material. These losses are typically substantial.

The prior art zoom optics generally work very well in energy frequency bands in which the selected lens materials are transmissive, but these zoom optical devices suffer from the disadvantage of being heavy and bulky. In addition, these devices generally require large lens diameters to increase the amount of energy focused on the detector while compensating for reflection and absorption losses.

In the long infrared wavelength spectrum, lens materials, such as flint glass, are not transparent. Thus, to obtain a refractive system sensitive to infrared energy, lenses made of exotic materials, such as silicon, germanium or sodium chloride, must be used. These materials are somewhat transparent at infrared wavelengths, but reflective losses still occur at each lens surface and absorption losses occur as the energy travels through the lens material. Moreover, infrared optical systems are expensive to manufacture, are delicate and may require special protection when they are used in different environments.

Refractive zoom optical systems are used to provide a change in the field of view and correspondingly a change in the magnification of an image. Since the focal point for two different wave lengths of light is different for a given refractive design, careful attention must be paid to the selection of lens materials and to the figure of the various lens to reduce chromatic aberration to an acceptable level. In addition to chromatic aberration, as the wavelength of the radiation varies, e.g., as the wavelength shortens to ultraviolet and beyond or lengthens to infrared on the other end of the spectrum, energy attenuation as the incoming radiation passes through lens elements becomes important. It is, in general, not possible with currently known lens materials to use a single material with ultraviolet, visible and infrared parts of the spectrum.

A reflective device provides two major advantages over refractive designs. First, reflective elements are free of chromatic aberration. This permits all wavelengths from ultraviolet to infrared to be focused at the same point. Secondly, although the reflectivity of mirror coatings may change with wavelength, a mirror is not subject to absorbtivity since the electromagnetic energy does not pass through the material.

The subject invention provides a zoom optical device, capable of selectively focusing and magnifying in fixed steps the image of an object emitting energy in wavelengths from ultraviolet through infrared, without the many disadvantages in cost and construction of the prior art devices.

SUMMARY OF THE INVENTION

Accordingly, it is an object of the present invention to provide a compact zoom optical device capable of selectively magnifying and focusing the image of an object, emitting energy in wavelengths from ultraviolet through infrared, on a fixed focal plane.

Other objects and advantages of this invention will become apparent hereinafter in the specification and drawings which follow.

The fixed step catoptric zoom system of the invention comprises a first and second plurality of reflectors, the first plurality of reflectors and a selectively positioned one of the second plurality of reflectors constitute a reflector set for transforming object energy into a real image of the object. The reflectors of the reflector set are axially spaced for receiving and reflecting the object energy. Each of the second plurality of reflectors is fixedly mounted relative to one another. Means are provided for rotatably mounting the second plurality of reflectors for selectively positioning each reflector of the second plurality of reflectors in succession to constitute successive reflector sets with the first plurality of reflectors. Each reflector of the second plurality of reflectors has focal length characteristics for providing different magnification to each of the reflector sets upon rotation into the selected position. Each reflector of the second plurality of reflectors is axially positioned within the mounting means for focusing the real image onto a fixed focal plane upon rotation into the selected position.

In one aspect, the rotatably mounting means comprises a turret means mounted to rotate about an axis perpendicular to the fixed focal plane. The second plurality of reflectors is circumferentially mounted thereto in planes parallel to the fixed focal plane. Motor means rotate the turret means, and means to control the rotation assure proper selective positioning of each second plurality of reflectors within each reflector set.

In another aspect, the rotatably mounting means comprises a support structure means mounted to rotate about an axis parallel to the fixed focal plane. The second plurality of reflectors are mounted within sides of the support structure perpendicular to the rotation plane of the support structure means. Motor means rotate the support structure means, and means to control the rotation assure proper selective positioning of each second plurality of reflectors within each reflector set.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

As used herein, the term "catoptric" refers to a device incorporating only reflective elements and not including any refractive element. The term "optical", as used herein, is intended to encompass energy having wavelengths from ultraviolet through infrared. The term "real image" is used in its traditional sense, i.e., the image is real if the rays emerging from the optical system form a convergent beam. The terms "magnifying" and "magnification", as used herein, are intended to encompass both increasing and decreasing the size of an image.

The invention is applicable to catoptric zoom optical systems, which transform received object energy into a real or magnified image of said object. The parent application, U.S. patend application Ser. No. 06/929,356, filed on Nov. 12, 1986, is incorporated herein by reference.

In accordance with the invention, the fixed step catoptric zoom system comprises a first and second plurality of reflectors, said first plurality of reflectors and a selectively positioned one of said second plurality of reflectors constituting a reflector set for transforming received object energy into a real image of said object, said reflectors of said reflector set being axially spaced for receiving and reflecting said object energy.

Figure 1:
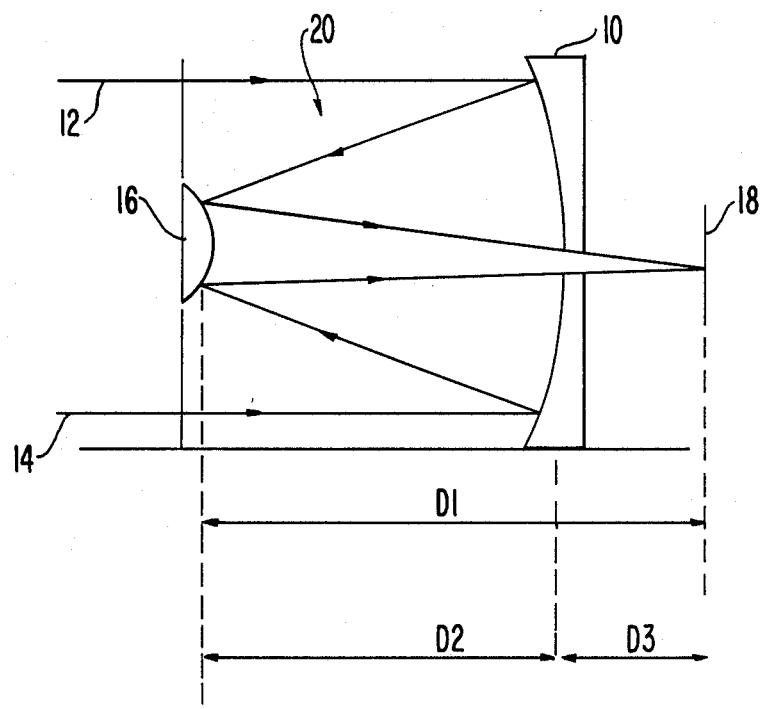
FIG. 1 is a schematic representation of the basic geometry of the invention.

As embodied herein and depicted in FIG. 1, a primary reflector 10 is disposed to receive energy, represented as rays 12, 14, from an object (not shown), and to reflect that energy to an axially-spaced secondary reflector 16 which is disposed to reflect the energy to generate an image of the object on a fixed focal plane 18. The axially aligned reflectors are collectively called a reflector set 20.

Primary and secondary reflectors 10, 16 are depicted as spherical reflective surfaces arranged in a simple Cassegrain optical arrangement. It must be understood that the principles of the invention will apply to reflective sets of non-spherical surfaces or combinations of spherical and non-spherical surfaces as in Cassegrain, Newtonian, Gregorian and Schwarzschild optical arrangements. The optical characteristics of such surfaces and arrangements are known and may be selected by one skilled in the art for use in the invention.

The invention is applicable to optical systems using a plurality of reflective surfaces which means any number of two or more reflections or reflectors. The description presented herein provides te design of a two element zoom telescope. While all embodiments of the invention will incorporate a primary reflector 10 receiving and reflecting the object energy, a plurality of axially-spaced coaxial secondary reflectors receiving and reflecting in series the energy reflected from the primary reflector 10 may be used in the invention. As apparent to one skilled in the field, increasing the number of reflections effectively increases the ability to modify the focal length of the system and control its physical length.

The focal length of a reflective system or set is a function of the focal lengths of the individual reflectors and the distances between the reflectors. The focal length F for a two-reflector Cassegrain arrangement as depicted in FIG. 1 is defined as $$F = \frac{f_1 f_2}{f_1 + f_2 - D_2} \quad (1)$$

where $f_1$ is the focal length of primary reflector 10, $f_2$ is the focal length of secondary reflector 16, $D_2$ is the air space of axial space between the reflectors, and F is the equivalent focal length of the reflector system or set.

As set forth in the referenced application, as the number of reflectors or reflections is increased, the equivalent focal length equation increases in complexity. However, the principle remains the same, and is a function of the individual focal lengths of the reflectors, and the axial distances between cooperating pairs of reflectors.

The magnification change M of a multiple magnification optical system is defined as the ratio of the tangents of the half angles subtended by the images of an object. Thus, $$M = \tan \phi_2 / \tan \phi_1 = (h_2/2F_2)/(h_1/2F_1)$$

where $\phi_1$ and $\phi_2$ are the subtended image half angles and $h_1$ and $h_2$ are the height of the two images, respectively. Since a detector size is constant, the height of the two images is necessarily the same. Thus, where $h_1 = h_2$:

$$M = \frac{F_2}{F_1} \quad (2)$$

where $f_1$ and $F_2$ are the focal lengths of the reflector set at the two zoom positions.

Therefore, to magnify the image of an object, the focal length of the reflector set must be changed. To magnify the image, and focus it on a fixed focal plane 18, two of the following must be varied:

(a) The distance between the secondary reflector and the focal plane, D1;

(b) The distance between the primary and secondary reflectors, D2;

(c) The shape of the primary reflector 10; and (d) The shape of the secondary reflector 16.

The fixed step catoptric zoom system comprises means to vary any two of the above design possibilities, thereby both magnifying and focusing an image on a fixed focal plane 18. However, unlike the embodiments described in the parent application, the optical elements are not physically moved axially. Instead, discrete changes in the field of view is provided by physically replacing the primary reflector 10, the secondary reflector 16, or both with reflective elements having different individual focal lengths.

Accordingly, each of said second plurality of reflectors is fixedly mounted relative to one another. Means are provided rotatably mounting said second plurality of reflectors for selectively positioning each of said second plurality of reflectors in succession to constitute successive reflector sets with said first plurality of reflectors. Each of said second plurality of reflectors has focal length characteristics for providing different magnification to each of the reflector sets upon rotation into said selected position. Each of said second plurality of reflectors is axially positioned within said mounting means for focusing said real image onto a fixed focal plane upon rotation into said selected position.

As depicted in FIG. 1, the primary reflector 10, the secondary reflector 16, or both reflectors may be replaced with differently shaped reflectors to change the magnification of the reflector set 20.

In one embodiment, the rotatably mounting means comprises a turret means mounted to rotate about an axis perpendicular to the fixed focal plane. The second plurality of reflectors is circumferentially mounted thereto in planes parallel to the fixed focal plane. Motor means rotate the turret means, and means to control the rotation assure proper selective positioning of each second plurality of reflectors within each reflector set.

Figure 2:
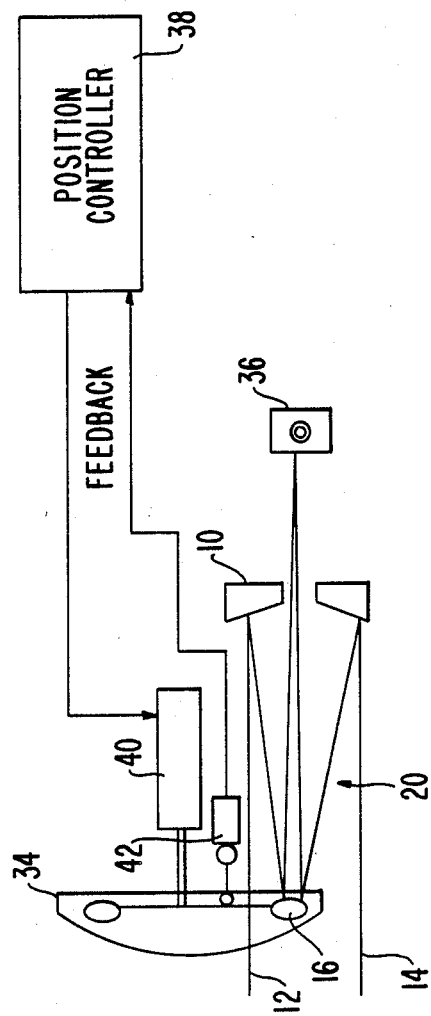
FIG. 2 is a side view of a schematic representation of one embodiment of the invention.
Figure 3:
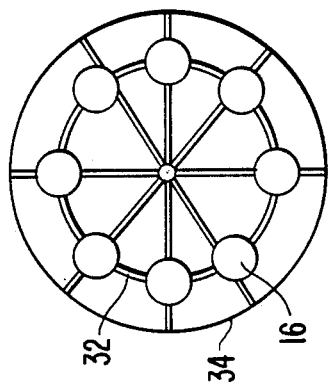
FIG. 3 is a front view of a rotating turret shown in the embodiment of FIG. 2.

An example of this embodiment is depicted in FIGS. 2 and 3. As shown in FIG. 3, any number of secondary reflectors 16 are circumferentially mounted in an open lattice support 32 within a rotating turret 34. As shown in FIG. 2, the desired secondary reflector 16 is axially aligned with primary reflector 10, to form a reflector set 20. Each one of the secondary reflectors 16 may be of a different shape, and are axially positioned in the open lattice support 32 such that the distance between the primary reflector 10 and the secondary reflector 16 results in focusing the object energy, represented as rays 12, 14, onto a fixed detector 36.

To change magnification, the user sends a command to a position controller 38 to move the desired secondary reflector 16 into axial alignment with the primary reflector 10. A motor 40 causes the turret 34 to rotate, and a position encoder 42 provides a feedback to the position controller 38 to assure proper alignment of the desired secondary reflector 16. The new combination of optical elements and spacing provide a new field of view, thereby providing a different degree of magnification. Note that in the above embodiment, two optical system variations are made. First, the shape of the secondary reflector 16 is changed; and secondly, the distance between the primary reflector 10 and secondary reflector 16 is changed.

Although the above embodiment depicts a change in the secondary reflector 16, the invention is not limited to this. The primary reflector 10 can also be changed using a similar lattice support 32 and rotating turret 34 combination, while a single secondary reflector 16 remains stationary. Additionally, both the primary reflector 10 and secondary reflector 16 can be changed. This latter possibility is particularly applicable to space applications.

One skilled in the art is fully capable of determining the changes in magnification of an image resulting from changes in axial spacing between reflectors of a reflector set 20 when the characteristics of the individual reflectors are known. It is within the skill in the art to employ various types of reflectors in various combinations and to determine the magnification and focusing effect of relative axial movement of the reflectors.

In accordance with the referenced application, more than two optical elements can be used in the reflector set 20 to effect a variation in the field of view and magnification. Furthermore, any of the optical elements may be varied in shape and distance in accordance with the present invention.

The novelty of the invention lies in providing an all reflective optical device with zoom capability, where both the shape and the axial distance of optical elements is varied by the use of a rotating structure.

In a particularly compact, second embodiment, the rotabably mounting means comprises a support structure means mounted to rotate about an axis parallel to the fixed focal plane. The second plurality of reflectors are mounted within sides of the support structure perpendicular to the rotation plane of the support structure means. Motor means rotate the support structure means, and means to control the rotation assure proper selective positioning of each second plurality of reflectors within each reflector set.

Figure 5:
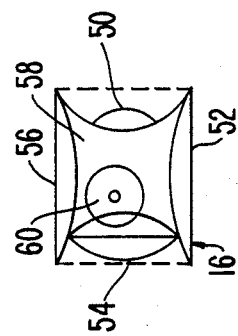
FIG. 5 is a top view of a support structure shown in the embodiment of FIG. 4.
Figure 4:
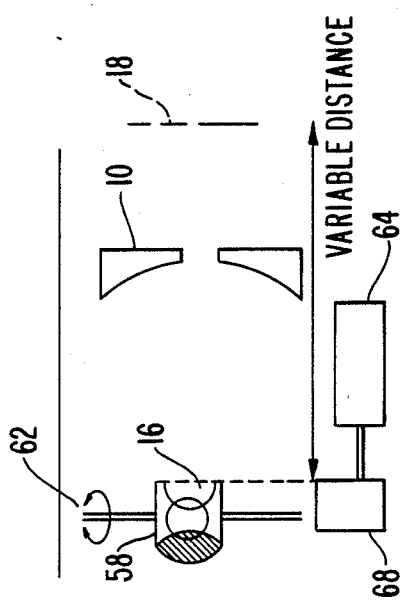
FIG. 4 is a side view of a schematic representation of a second embodiment of the invention.

An example of this embodiment of the invention is depicted in FIGS. 4 and 5. Referring now to FIG. 5, a plurality of secondary reflectors, individually labelled as 50, 52, 54, 56, are each respectively mounted within one side of a box-shaped support structure 58. The support structure 58 has an axis of rotation 60 eccentrically located, and extending through the two sides of the support structure 58 which are perpendicular to the fixed focal plane 18.

Referring now to FIG. 4, the support structure 58 is rotatably mounted to the optical bench via support 62. The support structure 58 is located in such a way that one of the secondary reflectors 16, individually labelled as 50, 52, 54, 56, may be axially aligned with the primary reflector 10. In operation, a drive motor 64 rotates the support structure 58, via a gear train 66, to position the desired secondary reflector 16 into alignment with the primary reflector 10. Each secondary reflector 50, 52, 54, 56 is of different shape, and due to the eccentric location of the axis of rotation 60, the distance between any given secondary reflector 16 and the primary reflector 10 and fixed focal plane 18 changes with each secondary reflector 16.

It will be apparent to those skilled in the art that various modifications and variations could be made in the catoptric device of the invention without departing from the scope or spirit of the invention.

What is claimed is:

1. A fixed step catoptric zoom system comprising:
   a first reflector and a plurality of second reflectors, said first reflector and a selectively positioned one of said second reflectors constituting a reflector set for transforming received object energy into a real image of said object, said reflectors of said reflector set being axially spaced for receiving and reflecting said object energy;
   means for mounting said plurality of second reflectors in fixed relation to one another;
   means for moving said mounting means to selectively position each of said plurality of second reflectors in succession into operative relation to said first reflector to constitute successive reflector sets;
   each of said plurality of second reflectors having different focal length characteristics for providing different magnification to each reflector set upon being positioned into said selected position; and each of said plurality of second reflectors being axially positioned within said mounting means for focusing said real image onto a fixed focal plane upon being positioned into said selected position.

2. The fixed step catoptric zoom system of claim 1 wherein said mounting means comprises a turret mounted to rotate about an axis perpendicular to said fixed focal plane, said plurality of second reflectors being circumferentially mounted thereto in planes parallel to said fixed focal plane, and wherein said moving means comprises means for rotating said turret and means for controlling rotation of said turret to assure proper selective positioning of each said plurality of second reflectors within each said reflector set.

3. The fixed step catoptric zoom system of claim 1 wherein said mounting means comprises a support structure mounted to rotate about an axis parallel to said fixed focal plane, said plurality of second reflectors being mounted on said support structure in planes parallel to said axis of rotation, and where said moving means comprises means for rotating said support structure and means for controlling rotation of said support structure to assure proper selective positioning of each said plurality of second reflectors within each said reflector set.

4. The fixed step catoptric zoom system of claim 2, wherein said controlling means comprises a position controller operatively controlling said rotating means to rotate said turret in accordance with an input from a user, and a position encoder to sense the rotational position of said turret and to provide a signal representative of said sensed position to said position controller.

5. The fixed step catoptric zoom system of claim 3 wherein the axis of rotation of said support structure is eccentrically located with respect to a line parallel to and equidistant from the planes of said plurality of second reflectors.

* * * * *